United States Patent
Strachan et al.

(10) Patent No.: US 10,310,852 B2
(45) Date of Patent: Jun. 4, 2019

(54) TIMING ESTIMATIONS FOR APPLICATION LIFECYCLE MANAGEMENT WORK ITEMS DETERMINED THROUGH MACHINE LEARNING

(71) Applicant: Hewlett Packard Enterprise Development LP, Houston, TX (US)

(72) Inventors: Shaul Strachan, Yehud (IL); George Kour, Haifa (IL); Raz Regev, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 176 days.

(21) Appl. No.: 15/280,428

(22) Filed: Sep. 29, 2016

(65) Prior Publication Data
US 2018/0088939 A1  Mar. 29, 2018

(51) Int. Cl.
| | | |
|---|---|---|
| *G06F 8/20* | (2018.01) | |
| *G06F 8/77* | (2018.01) | |
| *G06N 7/00* | (2006.01) | |
| *G06N 20/00* | (2019.01) | |
| *G06Q 10/06* | (2012.01) | |

(52) U.S. Cl.
CPC ............. *G06F 8/77* (2013.01); *G06F 8/20* (2013.01); *G06N 7/005* (2013.01); *G06N 20/00* (2019.01); *G06Q 10/06* (2013.01)

(58) Field of Classification Search
CPC ............................. G06Q 10/06; G06F 8/20
USPC ................................. 717/101, 102; 718/103
See application file for complete search history.

(56) References Cited

U.S. PATENT DOCUMENTS

| | | | |
|---|---|---|---|
| 8,560,467 B2 | 10/2013 | Ito et al. | |
| 8,881,095 B1 | 11/2014 | Hunt et al. | |
| 2007/0300185 A1* | 12/2007 | Macbeth | G06F 9/451 |
| | | | 715/825 |
| 2011/0313957 A1* | 12/2011 | Ide | G01C 21/20 |
| | | | 706/12 |
| 2013/0325763 A1* | 12/2013 | Cantor | G06Q 10/0633 |
| | | | 706/12 |

(Continued)

FOREIGN PATENT DOCUMENTS

| | | |
|---|---|---|
| CN | 104809879 A | 7/2015 |
| WO | WO-2001052121 A1 | 1/2002 |

OTHER PUBLICATIONS

Zheng et al., "Predicting Bug-Fixing Time: An Empirical Stady of Commercial Software Projects", 2013.*

(Continued)

*Primary Examiner* — Phillip H Nguyen

(57) ABSTRACT

In some examples, a method may include accessing data records of completed work items associated with managing a lifecycle of a software application and extracting feature values from the data records of the completed work items for a selected set of features. The method may also include determining timing data of state transitions for the completed work items from the data records and generating a predictor through machine learning using the timing data and the extracted feature values as input samples. The generated predictor may provide a transition probability of a particular state transition for a work item with specific feature values. The method may further include using the predictor to determine an estimated timing of the particular state transition for the uncompleted work item.

20 Claims, 5 Drawing Sheets

(56) References Cited

U.S. PATENT DOCUMENTS

| | | | |
|---|---|---|---|
| 2015/0205637 A1* | 7/2015 | Lee | G06F 9/505 718/105 |
| 2015/0339613 A1* | 11/2015 | Mendis | G06Q 10/06393 717/102 |
| 2015/0378722 A1* | 12/2015 | Zuniga-Hernandez | G06F 8/60 717/103 |
| 2016/0004982 A1 | 1/2016 | Cantor et al. | |

OTHER PUBLICATIONS

Messinger et al., "Applying machine learning to infant interaction: The development is in the details" (Year: 2010).*

Nam, J., et al., Transfer Defect Learning, The Hong Kong University of Science and Technology, Mar. 8, 2013, 10 pages.

Wang, J., "Predicting Defect Numbers Based on Defect State Transition Models." Proceedings of the ACM-IEEE international symposium on Empirical software engineering and measurement ACM 2012, 10 pages.

Extended European Search Report for EP Application No. 17190101.0-1871; dated Nov. 13, 2017; 7 pages.

* cited by examiner

TIMING ESTIMATIONS FOR APPLICATION LIFECYCLE MANAGEMENT WORK ITEMS DETERMINED THROUGH MACHINE LEARNING

BACKGROUND

With rapid advances in technology, electronic devices have become increasingly prevalent in society today. Application servers and other computing systems are but a few examples of electronic devices that may host and execute software applications. Software applications are becoming increasingly complex, and may include millions of lines of code (or more). Application development may be managed through application management systems.

BRIEF DESCRIPTION OF THE DRAWINGS

Certain examples are described in the following detailed description and in reference to the drawings.

DETAILED DESCRIPTION

Figure 1:
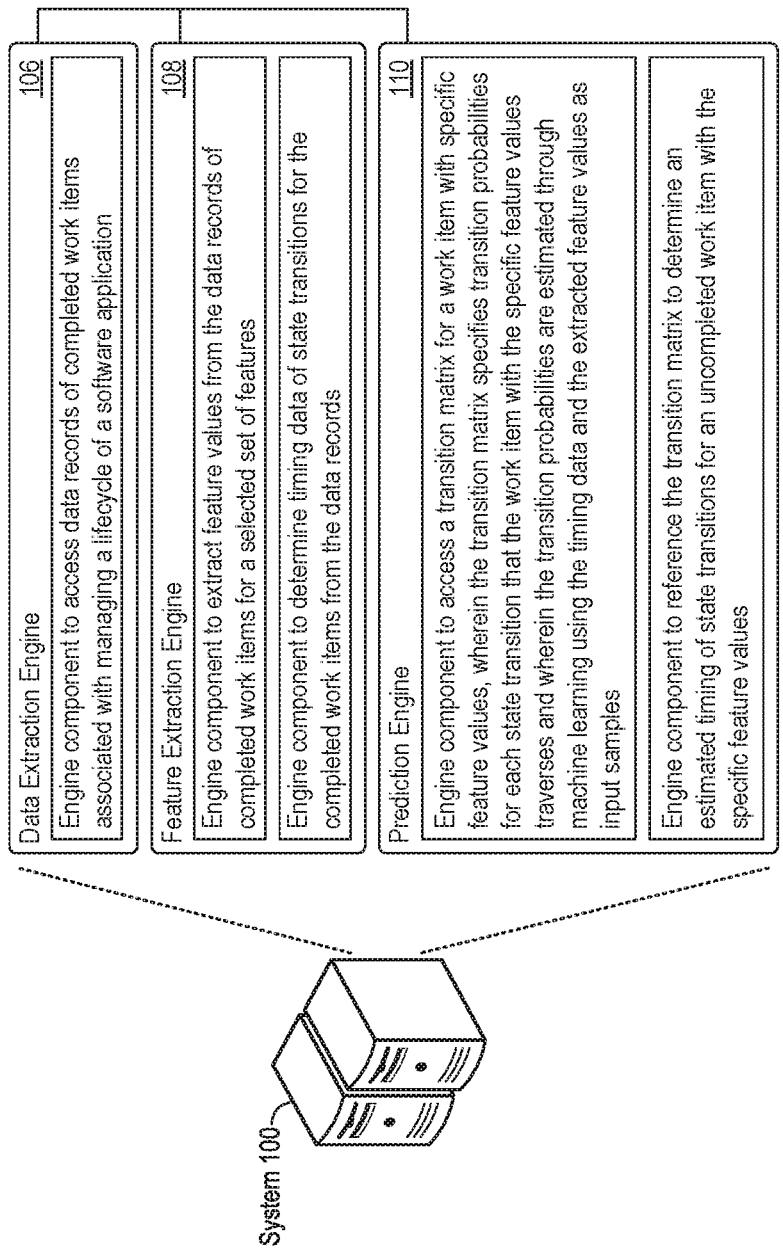
FIG. 1 shows an example of a system that may determine estimated timings for application lifecycle management work items through machine learning.

Application lifecycle management (ALM) software and systems may refer to any system, logic, or software that manages the planning, development, delivery, or support of software applications. Software development may involve tracking and management of application requirements, detected code defects, reported incidents for deployed software, and more. An ALM system may thus support managing of application development by tracking the lifecycle of work items associated with a software application. Outside of software development, management systems may provide management capabilities for work items of any type of project, such as building construction projects, enterprise workflows, physical product design, and countless more.

A work item (also referred to as an application lifecycle management work item) may refer to any representation of any item associated with a unit of work for a software application (or any other project). Various types of work items managed by an ALM system may include defects in the software application (to fix), requirements for the software application (to implement), incidents associated with the software application (to repair), and more. Depending on the complexity of a software application, the number of managed work items for a particular timeframe, version, or software release may number in the tens, to the tens of hundreds, to the tens of thousands, or more.

Tracking of work items (or type of work item) may be accomplished through assigned work item states. An ALM system may configure a fixed set of states that work item types traverse through during software development. For instance, defect work items may be in one of four configured states: a "new" state, an "open" state, a "fixed" state, and a "closed" state. Depending on the specific work item type, a particular work item may be in one of a various number of configured states.

Examples consistent with the present disclosure may support determination of estimated timings for work items through machine learning. The timing estimation features described herein may support determination of estimated times at which work items transition between different states, estimated times for work item completion, probability distributions for work item completion, predicted state distributions for work items in a given release cycle, or more. Through use of machine learning using extracted data from completed work items as input samples, determination of estimated timings for uncompleted work items is possible. As described in greater detail below, determined timing estimations for uncompleted work items may be specific to the particular features of the uncompleted work items, as opposed to a general, singular predictive model for all work items of a particular type. In that regard, the timing estimation features described herein may support predicting state transition timing for different work items of the same type with varying values for work item features (e.g., for defects of varying severities, product areas, defect authors, assignees, etc.).

FIG. 1 shows an example of a system 100 that may determine estimated timings for application lifecycle management work items through machine learning. The system 100 may take the form of any computing system, including a single or multiple computing devices such as servers, compute nodes, desktop or laptop computers, smart phones or other mobile devices, tablet devices, embedded controllers, and more.

The system 100 may estimate any number of timings for uncompleted work items managed by an ALM system. To do so, the system 100 may extract timing data and feature values from completed work items and apply any number of machine learning techniques to analyze the extracted timing data and feature values. Example results from the machine learning include regression or predictor models taking various forms, through which predicted timings can be determined for uncompleted work items. In using the machine learning, the system 100 may supply accompanying characteristics of completed work items (also referred to as feature values) to differentiate between work items with varying characteristics, including varying work item types (e.g., differentiating between defects and incidents) and varying work items of the same time (e.g., differentiating between severities of defect work items).

For example, the timing at which a particular defect work item transitions from an open state to a fix state to a closed state may vary depending on the particular developer or development team assigned to address the defect, the complexity of the application portion that the defect arose in, and many other factors. By extracting feature values for a selected set of features of completed work items and supplying the extracted feature values as input samples, predictors and models generated through machine learning may predict estimated timings of uncompleted work items with increased accuracy.

The system 100 may implement various engines to provide or support any of the features described herein. In the example shown in FIG. 1, the system 100 implements a data extraction engine 106, a feature extraction engine 108, and a prediction engine 110. The system 100 may implement the engines 106, 108, and 110 (and components thereof) in various ways, for example as hardware and programming. The programming for the engines 106, 108, and 110 may take the form of processor-executable instructions stored on a non-transitory machine-readable storage medium, and the processor-executable instructions may, upon execution, cause hardware to perform any of the features described herein. In that regard, various programming instructions of the engines 106, 108, and 110 may implement engine components to support or provide the features described herein.

The hardware for the engines 106, 108, and 110 may include a processing resource to execute those instructions. A processing resource may include various number of processors and may be implemented through single-processor or multi-processor architectures. In some examples, the system 100 implements multiple engines using the same system features or hardware components (e.g., a common processing resource).

The data extraction engine 106, the feature extraction engine 108, and the prediction engine 110 may include components to support determination of estimated timings for application lifecycle management work items through machine learning. In the example implementation shown in FIG. 1, the data extraction engine 106 includes an engine component to access data records of completed work items associated with managing a lifecycle of a software application. The feature extraction engine 108 shown in FIG. 1 includes an engine component to extract feature values from the data records of the completed work items for a selected set of features as well as an engine component to determine timing data of state transitions for the completed work items from the data records.

As also shown in the example implementation of FIG. 1, the prediction engine 110 includes an engine component to access a transition matrix for a work item with specific feature values, wherein the transition matrix specifies transition probabilities for each state transition that the work item with the specific feature values traverses and wherein the transition probabilities are estimated through machine learning using the timing data and the extracted feature values as input samples and an engine component to reference the transition matrix to determine an estimated timing of state transitions for an uncompleted work item with the specific feature values.

These timing estimation features for ALM work items and more are discussed in greater detail next. Many of the examples below are presented in the context of defect work items (or imply defects). However, the features described herein may be consistently implemented for work item types of any kind, such as incident work items, requirement work items, and more.

Figure 2:
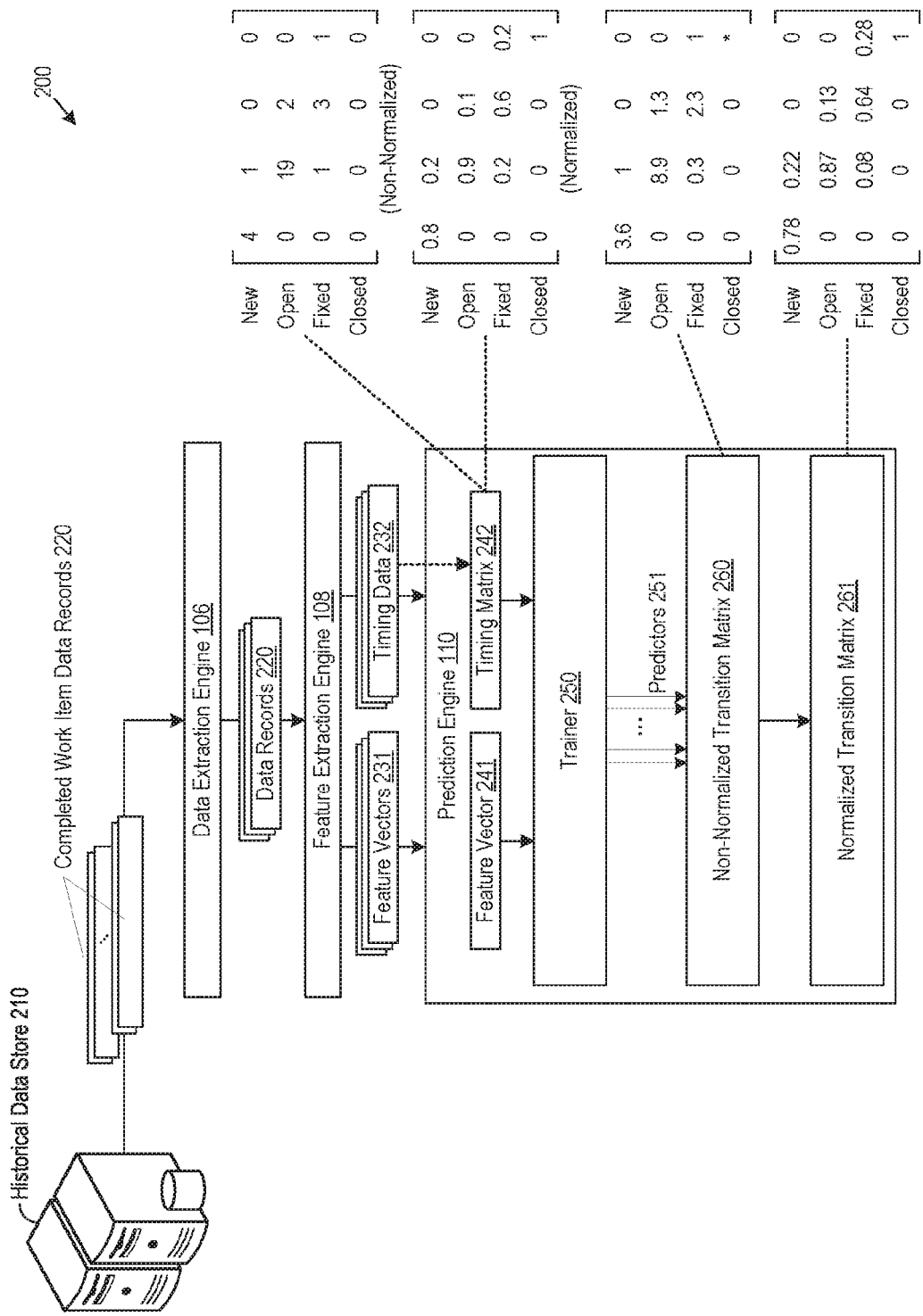
FIG. 2 shows an example architecture that supports analysis of completed work items through machine learning.

FIG. 2 shows an example architecture 200 that supports analysis of completed work items through machine learning. In the example shown in FIG. 2, the architecture 200 includes a historical data store 210, the data extraction engine 106, the feature extraction engine 108, and the prediction engine 110. An ALM system, for example, may implement the historical data store 210 and the engines 106, 108, and 110. In some examples, though, the historical data store 210 may be separate (logically or physically) from an ALM system. Additionally or alternatively, the engines 106, 108, and 110 may be separate (logically or physically) from the ALM system.

In operation, the data extraction engine 106 may access information for completed work items from the historical data store 210. In FIG. 2, the data retrieved by the data extraction engine 106 is shown as the data records 220. The historical data store 210 may include a database or storage medium storing data records for completed work items. The data records 220 may be specific to completed work items for a particular software application, and may include work items completed within a current release cycle of the particular software application, previous release cycles of the particular software application, or combinations of both.

The feature extraction engine 108 may extract feature values from the data records 220. Data records for completed work items may include various data fields describing features of the completed work items. The feature extraction engine 108 may extract these field values as feature values. Example data fields that may be populated for a completed work item include a summary, work item description, comments, open date, severity, status, detected by, assigned to, state transition dates, and so forth. To support differentiation between work items of the same type, the feature extraction engine 108 may identify a specific set of feature values for the completed work items.

The particular features that the feature extraction engine 108 may extract feature values for may be configured as a selected set of features. The specific features to differentiate work items may vary from release to release or application to application. As such, the feature extraction engine 108 may flexibly configure the selected set of features, for example based on user input. The selected set of features may include a selected subset of data fields for the completed work items. Extraction of different types of feature values by the feature extraction engine 108 are described in greater detail next.

The feature extraction engine 108 may extract feature values from data fields of the completed work item data records 220 based on associated data types that populate the data fields. When data types are not specifically specified or preset, the feature extraction engine 108 may automatically determine the data type, e.g., numeric, textual, categorical, etc. For numeric fields (e.g., data fields populated as numbers), the feature extraction engine 108 may extract numeric values directly. As examples, the feature extraction engine 108 may extract, as feature values, a number of days required to complete a work item (e.g., through a "Handling Time" data field of a completed work item data record), a software release version for the completed work item, etc.

For string fields (e.g., data fields populated through text strings), the feature extraction engine 108 may extract feature values through filtering or conversion of string values into numeric values. Doing so may increase the efficiency for using machine learning techniques such as regression model generation, predictor training, and the like. The feature extraction engine 108 may thus convert string values populated in the completed work item data records into binary, integer, or floating point numerals based on the possible string values that a particular data field may take. As an illustration, different string values may populate a "Severity" data field, such as "high", "medium", and "low". In this illustration, the feature extraction engine 108 represents each possible value of the severity data field as a numeral (e.g., feature values of 1, 2, and 3) or as a binary string representative of the particular string value (e.g., as 3-bit feature values '100' for "low", '010' for "medium", and '001' for "high").

Some data fields of the completed work item data records 220 may be populated as free form text (e.g., not associated with a particular category or not a selectable set of string values). Examples of such free form data fields include "Description" and "Comments" data fields. For these and similar data fields, the feature extraction engine 108 may generate a numerical feature value representing a characteristic of the populated data field. Example extracted feature values include a number of characters populated in the data field, a word count of the populated data field, and the like. In some examples, the feature extraction engine 108 assigns a numerical feature value based on a scale, e.g., a one to ten feature value scale mapped based on word count or character count ranges. Any other text analysis and numerical conversion framework may be used to extract a feature value from free form data fields of the data records 220, such as text mining, keyword analysis, sentiment analysis, and the like.

In some examples, the feature extraction engine 108 may adjust or itself configure the selected set of features. As an example, the feature extraction engine 108 may remove a particular feature from extraction when the particular feature has a low occurrence or population rate amongst the completed work items. The feature extraction engine 108 may filter data fields from feature extraction which have population percentages below a threshold percentage (e.g., populated in less than 10% of the completed work items). To illustrate, the feature extraction engine 108 may determine that an "Assigned To" data field is absent or not populated for more than threshold percentage of the data records 220 (e.g., greater than 90%). The feature extraction engine 108 may flag a given data field as having a relatively low population when its associated frequency is below a predetermined frequency. Due to reduced representation of data fields with relatively low population rate, the feature extraction engine 108 may eliminate, or filter, such data fields from feature value extraction.

To control the number of feature values extracted from the data records 220, the feature extraction engine 108 may group values for data fields with relatively low frequencies under a single "Other" data field. For example, the feature extraction engine 108 may determine the frequencies of each data field among the completed work item data records. The feature extraction engine 108 may flag populated values for a particular data field having an occurrence late below a threshold (e.g., less than 5 records or less than 2% of the records). These low occurring values may be aggregated and collectively represented as a single feature value. Thus, the feature extraction engine 108 may extract the feature values from a given completed work item by determining an aggregated feature value representative of multiple different features of the given completed work item.

In any of the ways described above, the feature extraction engine 108 may extract feature values from completed work item data records 220. To represent the extracted feature values, the feature extraction engine 108 may form feature vectors for the completed work items. The feature vector of a given work item may store or format extracted feature values from a given work item, e.g., in a preconfigured format or ordering. Through feature vectors, work items with similar or identical feature values (as compared through respective feature vectors) may be aggregated for analysis through machine learning. The extracted feature values and corresponding feature vectors may support differentiated timing estimations for different work items, as applied machine learning may use the different feature vectors to generate various predictive models based on different characteristics of various work items. The feature extraction engine 108 may pass extracted feature values to the prediction engine 110 through feature vectors, shown in FIG. 2 as the feature vectors 231.

The feature extraction engine 108 may also determine timing data for the completed work item data records 220 to pass as another data input for machine learning analysis. Timing data for a completed work item may refer to any data representative of an amount of time for the completed work item to transition states or reach completion. Thus, examples of timing data include a number of days for the work item to reach completion, a number of days the work item spent in respective work item states, state transition dates for the work item, a proportion (e.g., percentage) of time spent in a particular work state, a number of times a work item transitioned to various work item states, and more. In FIG. 2, the feature extraction engine 108 determines and passes the timing data 232 to the prediction engine 110.

The feature extraction engine 108 may determine the timing data 232 in various formats. In some examples, the feature extraction engine 108 determines the timing data 232 as a timing matrix, which may specify a proportion of time that a work item spent in various work item states. In the example of FIG. 2, the timing data 232 passed by the feature extraction engine 108 may include the timing matrix 242. The timing matrix 242 shown in FIG. 2 includes two versions, non-normalized version and a normalized version. An illustration by which the feature extraction engine 108 may construct both versions of the timing matrix 242 for a particular completed work item is provided next.

To generate a timing matrix, the feature extraction engine 108 may extract a state transition history of a completed work item. The state transition history may be included in the data records 220, and specify dates and other timing information as to state transitions traversed by a completed work item. An example state transition history may include the state transition data shown in Table 1 below:

TABLE 1

Example State Transition History for a Completed Work Item

| Previous State | New State | Transition Date (MM/DD) |
|---|---|---|
| (Null) | New | 10/01 |
| New | Open | 10/05 |
| Open | Fixed | 10/07 |
| Fixed | Open | 10/08 |
| Open | Fixed | 10/25 |
| Fixed | Closed | 10/28 |

From the state transition history, the feature extraction engine 108 may compute the number of days (or any other configurable time unit) that the completed work item spent in each state. The feature extraction engine 108 may also determine the number of times/days (or other configurable time unit) in which the completed work item transitioned from a previous state to a new state. In some examples, the feature extraction engine 108 may ignore or determine not to count state transitions that occur within a single day.

Using the determined number of days spent in particular states and number of state transitions, the feature extract engine 108 may construct a non-normalized timing matrix. An example non-normalized version of a timing matrix 242 is shown below:

| Example Non-Normalized Timing Matrix | | | | |
|---|---|---|---|---|
| | New | Open | Fixed | Closed |
| New | 4 | 1 | 0 | 0 |
| Open | 0 | 19 | 2 | 0 |
| Fixed | 0 | 1 | 3 | 1 |
| Closed | 0 | 0 | 0 | 0 |

In the example non-normalized timing matrix 242 above, the rows may represent a previous state of the work item and the columns may represent a new state. Thus, matrix elements in which the row and column value is the same (e.g., New-New) represent a day (or other time unit) in which the work item remained in the same state. As seen from the example non-normalized timing matrix 242 above, the feature extraction engine 108 determines the completed work item spent 19 days in the "Open" state and traversed the Open-Fixed state transition 2 times. Similar time spent and transition numbers are shown in the non-normalized timing matrix 242 for other states and transitions as well.

The feature extraction engine 108 may normalize a non-normalized timing matrix to obtain a normalized version of a timing matrix 242. To do so, the feature extraction engine 108 may sum each row and divide each row element by the row sum. Thus, for the first row, the feature extraction engine 108 may calculate a row sum of 5, and normalized row values of 0.8, 0.2, 0 and 0 respectively. In such a way, the feature extraction engine 108 may determine the timing matrix 242, shown below:

Example Normalized Timing Matrix

|  | New | Open | Fixed | Closed |
|---|---|---|---|---|
| New | 0.8 | 0.2 | 0 | 0 |
| Open | 0 | 0.9 | 0.1 | 0 |
| Fixed | 0 | 0.2 | 0.6 | 0.2 |
| Closed | 0 | 0 | 0 | 1 |

Note that for a final state of the completed work item, the feature extraction engine 108 may populate an appropriate row value to indicate the completed work item always remains in a final state (e.g., the completed work item does not transition from the "Closed" state to any other state, thus always remains in the "Closed State"). The normalized version of the timing matrix 242 is also illustrated in FIG. 2.

Turning now to the prediction engine 110, the prediction engine 110 may receive the extracted feature values (e.g., as the features vectors 231) and timing data 232 and use the extracted feature values and timing data as input samples for machine learning. As an example shown in FIG. 2, the prediction engine 110 supplies a feature vector 241 and a timing matrix 242 as input samples to a trainer 250, which may apply any number of machine learning techniques to generate a predictive model. The feature vector 241 and the timing matrix 242 may characterize a particular completed work item, with the feature vector 241 indicating specific feature values of the particular completed work item and the timing matrix 242 providing timing data for different state transitions for the particular completed work item.

In applying the machine learning, the prediction engine 110 may use a normalized version of a timing matrix 242, a non-normalized version of the timing matrix 242, or both. Each entry of the timing matrix 242 may effectively represent a particular state transition for a completed work item (in which remaining in the same state is also considered a state transition). In some examples, each entry in the timing matrix 242 may be paired with the feature vector 241 as an input sample. Thus, the feature vector 241 and timing matrix 242 may be broken down as 16 different input samples to the trainer 250, each input sample applicable to one of the 16 state transitions that the completed work item could theoretically traverse (though in actuality, some of which are prohibited by an ALM system).

In some implementations, the prediction engine 110 may filter certain input sample pairs, for example input pairs for state transitions that are irrelevant, disallowed, or not possible. As an example, a particular work item may be prohibited or prevented from subsequent state transitions upon reaching a final state. The prediction engine 110 may preclude timing data related to transitions from the final state from being input as samples to the machine learning. Using the timing matrix 242 as an example, the prediction engine 110 may filter the last row of the timing matrix 242 (normalized or non-normalized) from inputs provided to the trainer 250, which represents example prohibited state transitions of "Closed"-"New", "Closed"-"Open", and "Closed"-"Fixed" as well as the "Closed"-"Closed" transition (which will always occur if no other transitions from the "Closed" state are permitted). In that regard, the prediction engine 110 may reduce the number of predictors generated from the timing matrix 242, e.g., from 16 to 12 and possibly more if the prediction engine 110 precludes consideration of other prohibited state transitions.

The trainer 250 may receive input samples representing timing data of various state transitions for work items for varying feature vector values. The trainer 250 may apply any number of machine learning techniques or algorithms with regards to work item timing data and feature vector input samples to develop models, classifiers, or any other output to predict transition probabilities for work items. As example machine learning techniques, algorithms, and outputs, the trainer 250 may use a tree ensemble learner, regression modeling, predictive modeling, and the like. In FIG. 2, the trainer 250 uses machine learning to generate predictors 251.

The types of predictors generated by the trainer 250 may vary depending on the specific version of timing data input to the trainer 250. Responsive to receiving input samples including non-normalized timing data, the trainer may generate predictors that specify a number of time units (e.g., days) a work item is predicted to remain in various work item states (which may be referred to as an estimated state duration), a predicted number of state transitions between different work item states (which may be referred to as an estimated transition number), or a combination of both. Thus, a predictor generated by the prediction engine 110 may specify a number of estimated days a work item characterized by specific feature values (for example, the feature vector 241) may remain in a "New" state and similar estimated times for the "Open" state and the "Closed" state. Another predictor generated by the prediction engine 110 using non-normalized timing data may specify an estimated number of state transitions, such as an expected number of transitions a work item characterized by the feature vector 241 will traverse a "New"-"Open" transition, an "Open"-"Fixed" transition, a "Fixed"-"Open" transition, etc.

Responsive to receiving input samples including normalized timing data, the prediction engine 110 may generate predictors that specify a transition probability. Put another way, generated predictors may specify a specific transition probability for a work item characterized by specific feature values (e.g., with a specific feature vector). Thus, a predictor generated by the prediction engine 110 may specify a transition probability for "New"-"New" state transition for a work item characterized by a specific feature vector. Another predictor generated by the prediction engine 110 may specify a transition probability for a different state transition for the work item characterized by the specific feature vector (e.g., a "New"-"Open" state transition). Yet another predictor generated by the prediction engine 110 may specify a transition probability for the same "New"-"New" state transition, but for a work item characterized by another feature vector (and thus different extracted feature values) from the specific feature vector.

In some examples, the prediction engine 110 creates a transition matrix for work items with specific feature values. The prediction engine 110 may create a transition matrix as an aggregation of a number of predictors created through machine learning usage (e.g., a number of predictors equal to the number of possible state transitions that a work item can traverse). Generated transition matrices may be normalized or non-normalized.

In FIG. 2, the feature extraction engine 108 generates the non-normalized transition matrix 260 for work items with specific feature values (e.g., as characterized by the feature vector 241 specifically). The non-normalized transition matrix 260 generated by the prediction engine 110 may specify an estimated number of time units (e.g., days) that a work item with the specific feature values will remain in various work item states as well as an estimated number of state transitions the work item will traverse for various state transitions. As an example, the non-normalized transition matrix 260 generated by the prediction engine 110 may include the following values:

| Example Non-Normalized Transition Matrix | | | | |
|---|---|---|---|---|
| | New | Open | Fixed | Closed |
| New | 3.6 | 1 | 0 | 0 |
| Open | 0 | 8.9 | 1.3 | 0 |
| Fixed | 0 | 0.3 | 2.3 | 1 |
| Closed | 0 | 0 | 0 | — |

The number of estimated time units the work item remains in various states may be specified through a diagonal of entries in the transition matrix 260 in which the row and column values are equal (e.g., including the "New"-"New" entry, the "Open"-"Open" entry, etc.). Thus, the example transition matrix 260 above may specify work items with specific feature values are predicted to spend 3.6 days in the "New" state, 8.9 days in the "Open" state, 2.3 days in the "Fixed" state. In the transition matrix 260, entries outside of the diagonal with equal column and row values may specify a number of estimated state transitions. As such, the transition matrix 260 above may indicate work items with specific feature values are, overall, expected to traverse the "Open"-"Fixed" transition 1.3 times and traverse the "Fixed"-"Open" transition 0.3 times. Thus, the prediction engine 110 may generate a transition matrix 260.

The prediction engine 110 may generate a normalized version of the transition matrix 260, such as the normalized transition matrix 261 shown in FIG. 2. Entries of the normalized transition matrix 261 specify transition probabilities for each state transition that work items with the specific feature values traverse, and the transition probabilities may be estimated through machine learning using the timing data 232 and the extracted feature values (e.g., the feature vector 241) as input samples. Thus, for work items with the specific feature values specified through the feature vector 241, the normalized transition matrix 261 may specify the transition probability for each of the 16 state transitions that the work item may traverse (or 12 state transitions, if the prediction engine 110 precludes consideration of state transitions with the "Closed" state as an initial state in the transition).

As an example, the normalized transition matrix 261 generated by the prediction engine 110 may include the following values (also shown in FIG. 2):

| Example Normalized Transition Matrix | | | | |
|---|---|---|---|---|
| | New | Open | Fixed | Closed |
| New | 0.78 | 0.22 | 0 | 0 |
| Open | 0 | 0.87 | 0.13 | 0 |
| Fixed | 0 | 0.08 | 0.64 | 0.28 |
| Closed | 0 | 0 | 0 | 1 |

In some examples, the prediction engine 110 generates the normalized transition matrix 261 by normalizing the values of transition matrix 260 (e.g., on a row-by-row basis such that the sum of each row is 1). In other examples, the prediction engine 110 may generate a normalized transition matrix through the trainer 250, using normalized timing data as input samples to generate transition probability predictors that together form the normalized transition matrix 261. Thus, the prediction engine 110 may generate a normalized transition matrix 261 that specifies transition probabilities for various state transitions that a work item may traverse.

The prediction engine 110 may create multiple transition matrices applicable to work items with varying feature values. For a particular feature vector (and thus, specific feature values), the prediction engine 110 may construct a non-normalized transition matrix, a constructed transition matrix, or both. As such, the prediction engine 110 may create, via machine learning, a transition matrix for a work item with specific feature values and create, via the machine learning, a different transition matrix for a work item with different feature values from the specific values. The different transition matrix may specify transition probabilities, estimated state durations, estimated transition numbers, or any combination thereof for each state transition that the work item with the different feature values traverses.

As described above, the prediction engine 110 may use machine learning to generate a predictive model for timing estimates for work items characterized by specific feature values. The predictive model may include predictors that provide transition probabilities, estimated state durations, or estimated transition numbers specific to particular work item state transitions, which may be aggregated to form transition matrices that provide state transition probabilities, estimated state durations, or estimated transitions numbers for each state transition that a work item with specific feature values may traverse. Using the predictive model, an ALM system may determine estimation timings, e.g., predicted state transition timing or completion times, as well as other information for uncompleted work items.

Figure 3:
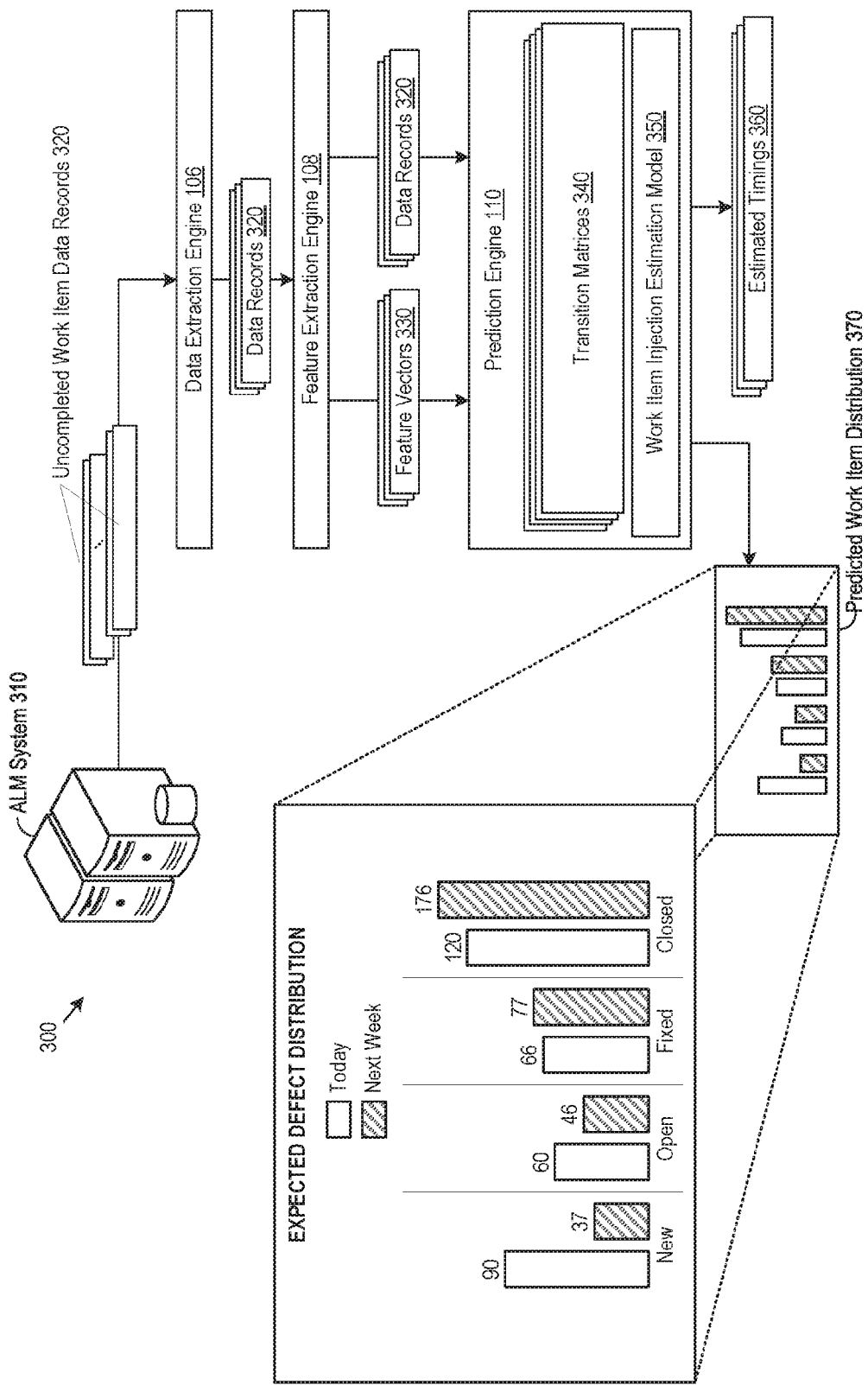
FIG. 3 shows an example architecture that supports determination of estimated timings for uncompleted work items.

FIG. 3 shows an example architecture 300 that supports determination of estimated timings for uncompleted work items. The example architecture 300 shown in FIG. 3 includes an ALM system 310, a data extraction engine 106, a feature extraction engine 108, and a prediction engine 110. Although the ALM system 310 is shown separately from the engines 106, 108, and 110, the ALM system 310 itself may implement the engines 106, 108, and 110 in some examples (e.g., as a combination of hardware and programming).

In operation, the data extraction engine 106 may access uncompleted work items managed for development or support of a software application, for example as data records or entries in the ALM system 310. In FIG. 3, the data extraction engine 106 accesses uncompleted work items as the uncompleted work item data records 320. The feature extraction engine 108 may extract feature values for the uncompleted work items, for example in a consistent manner as described above for the completed work item data records 220. In doing so, the feature extraction engine 108 may compile feature vectors that include extracted feature values for the uncompleted work items, shown in FIG. 3 as the feature vectors 330.

The prediction engine 110 may receive the feature vectors 330, the uncompleted work item data records 320 (or selected portions thereof), or a combination of both. From the received inputs, the prediction engine 110 may determine estimated timing for any number of uncompleted work items, such as predicted state transition times for any of the uncompleted work items, estimated completion times, and various other timing estimations. In computing such estimated timings, the prediction engine 110 may access a predictive model generated through use of machine learning as described herein. In FIG. 3, the prediction engine 110 may access a set of transition matrices 340, which specify transition probabilities, estimated state durations, estimated transition numbers, or any combination thereof for various state transitions of the uncompleted work items. Each transition matrix in the transition matrices 340 may provide such estimations for work items with different feature values, allowing an ALM system to differentiate predicted timings based on the specific characteristics of an uncompleted work item.

In some examples, the prediction engine 110 may use a transition matrix and employ Markov chaining techniques (or any other probability algorithms) to estimate when (e.g., an estimated date that) a particular uncompleted work item transitions to a particular state, completes (e.g., reaches a final state), and the like. Thus, the prediction engine 110 may generate the estimated timings 360 for the uncompleted work item data records 320. For example, the prediction engine 110 may determine an estimated completion date for an uncompleted work item by summing the estimated state durations for each remaining state that the uncompleted work item will traverse to completion.

In some examples, the prediction engine 110 may identify a number of days (or other time units) that a particular uncompleted work item has already spent in a particular state, and determine a completion time or estimated transition timing accounting for the number of elapsed days in the present state. To illustrate, the prediction engine 110 may determine timing estimations for an uncompleted work item that has spent 4 days in an "Open" state. Accessing a non-normalized transition matrix for this illustrated work item, the prediction engine 110 may determine estimated state durations of 8.9 days for the "Open" state and 2.3 days for a "Fixed" state. In this example, the prediction engine 110 may predict that the uncompleted work item will spend 4.9 more days in the "Open" state before transitioning to the "Fixed" state (e.g., 8.9-4, accounting for the number of days already spent in the "Open" state). The prediction engine 110 may additionally or alternatively estimate the uncompleted work item will complete in 7.2 days (e.g., by also accounting for the estimated state duration of the "Fixed" state).

For a set of multiple uncompleted work items, the prediction engine 110 may generate a predicted work item distribution using the transition matrices 340, A predicted work item distribution may estimate the number of work items in different work item states at a future time period. Such a distribution may be determined using Markov chain techniques as well, or through any other probability algorithms. In some examples, the prediction engine 110 may generate a predicted work item distribution through application of a work item injection estimation model. The work item injection estimate model may estimate a number of work items entering an initial work item state. A work item injection model 350 in FIG. 3 may, for example, estimate a number of defect work items entering a "New" state from the current time to the subsequent time period at subject in a predicted work item distribution. As such, the prediction engine 110 may generate a predicted work item distribution 370 accounting for additional defect work items that may be discovered and "opened" during development.

An example predicted work item distribution 370 is shown in FIG. 3, which specifies a number of completed work items and uncompleted work items for four different work item states: "New", "Open", "Fixed", and "Closed". As seen in the example of FIG. 3, the predicted work item distribution 370 may provide a current distribution (e.g., for a current time, such as "today") as well as a future distribution (e.g., for a future time, such as "next week"). Multiple estimated distributions may be visualized in the same predicted work item distribution, for example as a current week, one week later, two weeks later, and so on. The specific future time period for which a predicted work item distribution is computed may be customized, selected, or otherwise configured, for example based on user input.

Through a generated predictive model, the transition matrices 340, generated predictors, and the like, the prediction engine 110 may use estimated states of uncompleted work item in specific ways. For instance, the prediction engine 110 may estimate a number of defect work items that may be reopened during development (e.g., traverse a "Fixed"-"Open" state transition), which may be analyzed at a feature-specific granularity. Thus, the prediction engine 110 may estimate which developers are predicted to have a highest or lowest defect reopen rate, the severity distribution of the defect work items predicted to reopen, which code portions are predicted to have the least percentage of defect work items completed a week before a release date, and much more.

Thus, the prediction engine 110 may provide forecasting capabilities to an ALM system, through which issues in application development may be addressed. In view of the estimated timings 360, predicted work item distribution 370, or any other data computed for uncompleted (or completed) work items, the prediction engine 110 may provide an automatic response. As an example, the prediction engine 110 may propagate a communication when a predicted number of uncompleted work items exceeds a threshold number or percentage with respect to a particular future date (e.g., a threshold number of days before a scheduled release). As other examples, the prediction engine 110 may remove a portion of code from a subsequent software release, send a reassignment notification for selected developers to redirect efforts to a particular code portion, or take any other configurable action in response.

Figure 4:
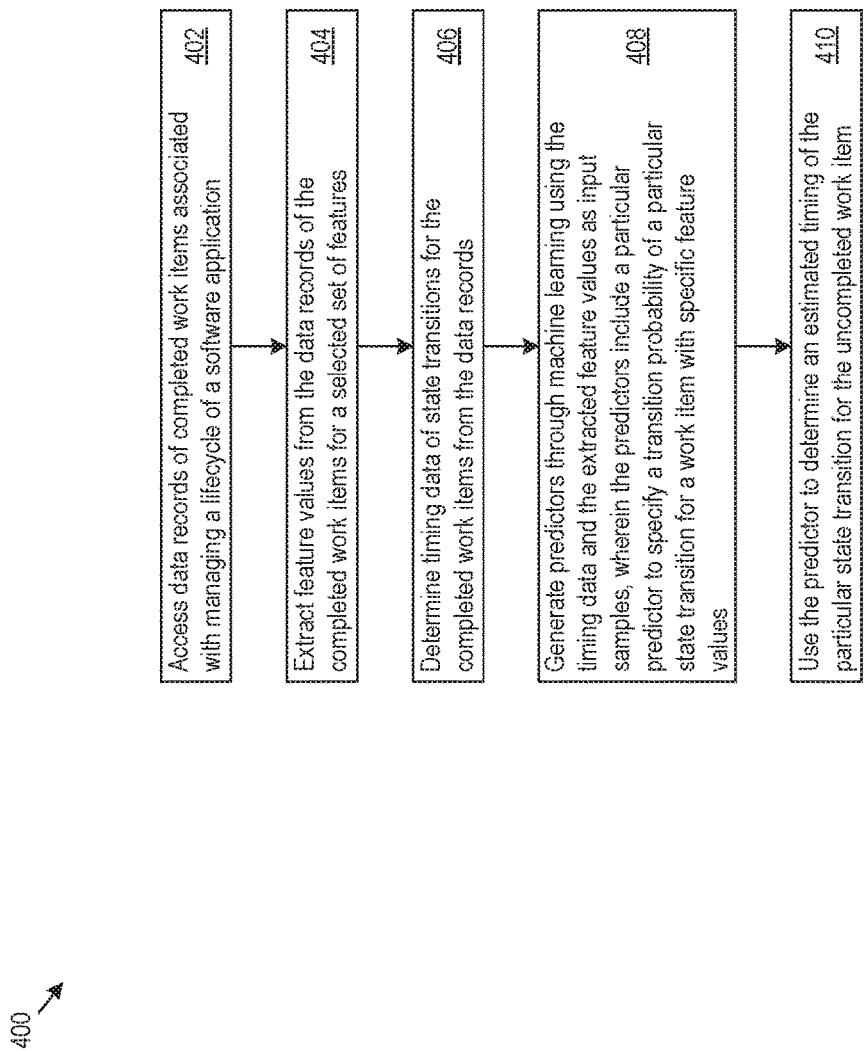
FIG. 4 shows an example of logic for determination of estimated timings for application lifecycle management work items through machine learning.

FIG. 4 shows an example of logic 400 for determination of estimated timings for application lifecycle management work items through machine learning. Implementation and execution of the logic 400 is described with reference to the data extraction engine 106, the feature extraction engine 108, and the prediction engine 110. However, any other device, logic, hardware-programming combination, or other suitable computing system may execute any of the elements of the logic 400 as a method. In some examples, the logic 400 may be implemented in the form of executable instructions stored on a machine-readable storage medium and/or in the form of electronic circuitry. Execution of the logic 400 by a processor may cause the processor or a system to perform a method for determination of estimated timings of work items through machine learning.

In implementing or executing the logic 400, the data extraction engine 106 may access data records of completed work items associated with managing a lifecycle of a software application (402). The feature extraction engine 108 may extract feature values from the data records of the completed work items for a selected set of features (404). The set of features for which the feature extraction engine 108 extracts values from may be configurable or adjusted, for example based on the population of various data fields of the accessed data records. In some examples, the feature extraction engine 108 extracts the feature values from a given completed work item by determining an aggregated feature value representative of multiple different features of the given completed work item.

The feature extraction engine 108 may also determine timing data of state transitions for the completed work items (406). For example, the feature extraction engine 108 may create a timing matrix from the accessed data records, e.g., in a consistent manner as described above for generation of the timing matrix 242. Other formats of timing data are possible as well. In some examples, the feature extraction engine 108 pairs the extracted feature values (e.g., as a feature vector) with various entries of the timing matrix, which may thereby form a feature vector-timing matrix element pair. The feature extraction engine 108 may provide such pairs as input samples for machine learning.

In implementing or executing the logic 400, the prediction engine 110 may generate predictors through machine learning using the timing data and the extracted feature values as input samples, wherein the predictors include a particular predictor to specify a transition probability of a particular state transition for a work item with specific feature values (408). The generated predictors may be part of a predictive model created using the machine learning, for example as components of regression models, transition matrices, tree ensemble logic structures, decision networks, etc. generated through machine learning. In some examples, the prediction engine 110 generates multiple predictors, such as predictors for each of the different state transitions a work item with specific feature values may traverse or predictors for the same state transition but for work items with varying feature values for the selected set of features.

For instance, the predictors generated by the prediction engine 110 may include other predictors to specify transition probabilities of different state transitions (differing from the particular state transition) for a work item with the specific feature values. Additionally or alternatively, the generated predictors may include another predictor that specifies a different transition probability of the particular state transition for a work item with feature values different from the specific feature values. The prediction engine 110 may use the predictors or any other predictive models generated from the machine learning to determine timing estimations for uncompleted work items. For instance, the prediction engine 110 may use the particular predictor to determine an estimated timing of the particular state transition for an uncompleted work item (410).

In some examples, the prediction engine 110 may further generate a predicted work item distribution using the predictors, wherein the predicted work item distribution estimates a number of uncompleted work items in different work item states at a future time period. In generating the predicted work item distribution, the prediction engine 110 may apply a work item injection estimation model to estimate a number of work items entering an initial work item state. The work item injection estimation model may, for example, forecast a number of defect work items that would be created at a particular point in a software development lifecycle, by which the prediction engine 110 may forecast the number of uncompleted or completed work items in various work item states at different points in the future.

As another example, the prediction engine 110 may predict a completion time for the uncompleted work item using the predictors. Estimating the completion time may include the prediction engine 110 aggregating a predicted timing for each state transition that the uncompleted work item traverses in order to reach completion. Using the example work item states discussed in the illustrations above, the prediction engine 110 may determine estimated timings for the state transitions the uncompleted work item may traverse to reach a final state.

For a defect work item in a "New" state for example, the prediction engine 110 may aggregate the predicted timing for a "New"-"Open" state transition, an "Open"-"Fixed" state transition, a "Fixed"-"Open" transition, as well as the possibility of a "Fixed"-"Open" transition (e.g., if the defect is not addressed satisfactorily). Using such predictive models, the prediction engine 110 may apply, for example, Markov chains to determine probabilities and timing estimations for state transitions to determine an estimated completion time of the uncompleted work item. In some examples, the prediction engine 110 may further determine a confidence level for the estimate completion time, a probability distribution of different dates and times at which the uncompleted work item may complete, or both.

Although one example was shown in FIG. 4, the logic 400 may include any number of additional or alternative features as well, including any other features described herein with respect to the data extraction engine 106, the feature extraction engine 108, the prediction engine 110, or any combination thereof. For example, the logic 400 may additionally or alternatively generate predictors or a transition matrix that specify estimated state durations (e.g., an estimated number of days work items remain in a particular state before transition), estimate transition numbers (e.g., an estimated number of times work items will traverse a particular state transition), or combinations of both. The logic 400 may be executed or performed as a method including elements implementing any combination of the timing estimation features described herein.

Figure 5:
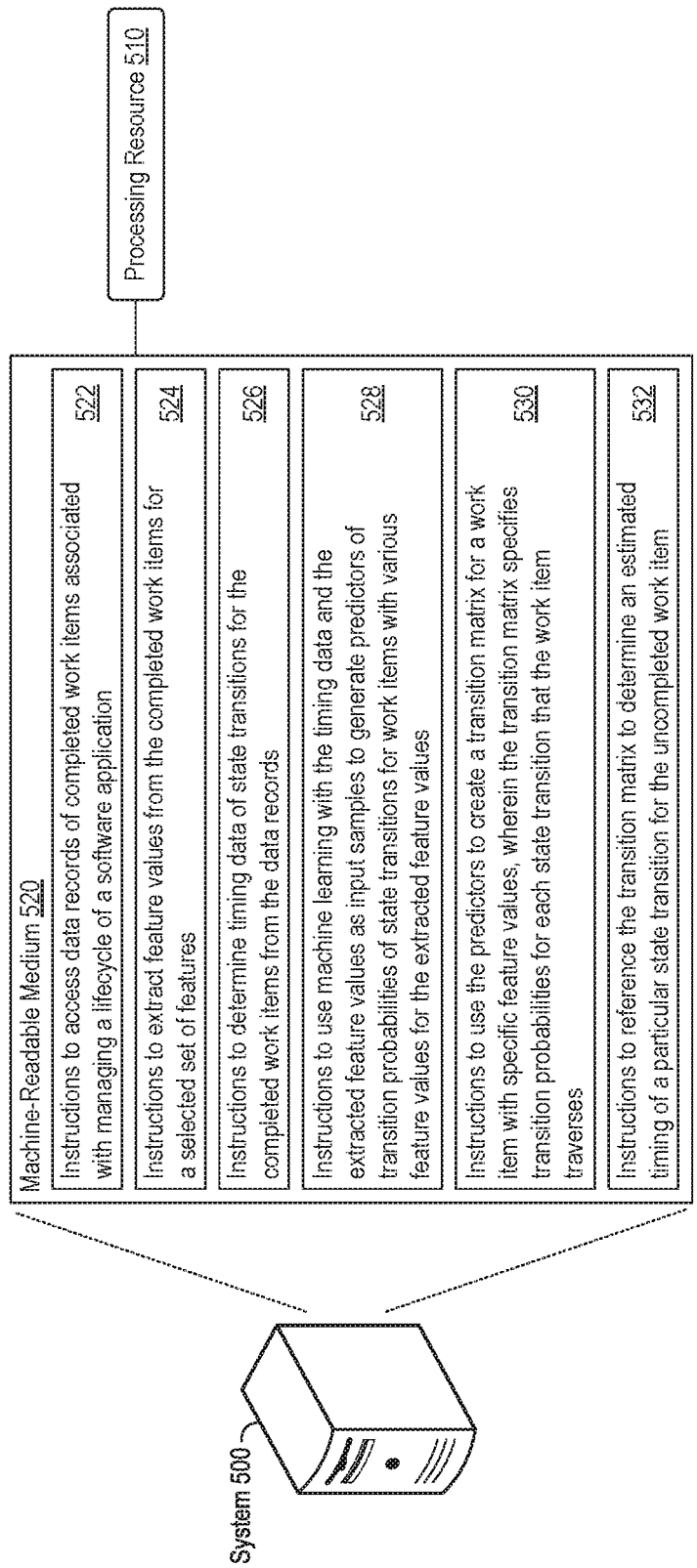
FIG. 5 shows an example of a system that may determine estimated timings for application lifecycle management work items through machine learning.

FIG. 5 shows an example of a system 500 that may determine estimated timings for application lifecycle management work items through machine learning. The system 500 may include a processing resource 510, which may take the form of a single or multiple processors. The processor(s) may include a central processing unit (CPU), microprocessor, or any hardware device suitable for executing instructions stored on a machine-readable medium, such as the machine-readable medium 520 shown in FIG. 5. The machine-readable medium 520 may be any non-transitory electronic, magnetic, optical, or other physical storage device that stores executable instructions, such as the instructions 522, 524, 526, 528, 530, and 532 in FIG. 5. As such, the machine-readable medium 520 may be, for example, Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The system 500 may execute instructions stored on the machine-readable medium 520 through the processing resource 510. Executing the instructions may cause the system 500 to perform any of the timing estimation features described herein, including according to any features of the data extraction engine 106, feature extraction engine 108, prediction engine 110, or any combination thereof.

For example, execution of the instructions 522, 524, 526, 528, 530, and 532 by the processing resource 510 may cause the system 500 to access data records of completed work items associated with managing a lifecycle of a software application (instructions 522); extract feature values from the data records of the completed work items for a selected set of features (instructions 524); determine timing data of state transitions for the completed work items from the data records (instructions 526); use machine learning with the timing data and the extracted feature values as input samples to generate predictors of transition probabilities of state transitions for work items with various feature values for the extracted feature values (instructions 528); use the predictors to create a transition matrix for a work item with specific feature values, wherein the transition matrix specifies transition probabilities for each state transition that the work item traverses (instructions 530); and reference the transition matrix to determine an estimated timing of a particular state transition for the uncompleted work item (instructions 532).

In some examples, the machine-readable medium 520 may store instructions further executable to use the predictors to create a transition matrix for a work item with different feature values from the specific feature values. As another example, the machine-readable medium 520 may store instructions further executable to generate a predicted work item distribution using the predictor, wherein the predicted work item distribution estimates a number of uncompleted work items in different work item states at a future time period. Such instructions may be executable to generate a predicted work item distribution through application of a work item injection estimation model to estimate a number of work items entering an initial work item state (e.g., a "New" state for defect work items). As yet another example, the machine-readable medium 520 may include instructions further executable to estimate a completion time for the uncompleted work item using the transition matrix, including through aggregation of predicted timings for each state transition that the uncompleted work item traverses in order to reach completion.

While some example instructions are shown in FIG. 5, the machine-readable medium 520 may store instructions executable to implement or perform any combination of the timing estimation features described herein. For example, the instructions stored on the machine-readable medium 520 may be additionally or alternatively executable to generate predictors or a transition matrix that specify estimated state durations (e.g., an estimated number of days work items remain in a particular state before transition), estimate transition numbers (e.g., an estimated number of times work items will traverse a particular state transition), or combinations of both.

The systems, methods, devices, engines, and processes described above, including the data extraction engine 106, the feature extraction engine 108, and the prediction engine 110, may be implemented in many different ways in many different combinations of hardware, logic, circuitry, and executable instructions stored on a machine-readable medium. For example, the data extraction engine 106, the feature extraction engine 108, the prediction engine 110, or any combination thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the feature extraction engine 108, the prediction engine 110, or both.

The processing capability of the systems, devices, and engines described herein, including the data extraction engine 106, the feature extraction engine 108, and the prediction engine 110, may be distributed among multiple system components, such as among multiple processors and memories, which may include multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
through a processor:
accessing data records of completed work items associated with managing a lifecycle of a software application;
extracting feature values from the data records of the completed work items for a selected set of features;
determining timing data of state transitions for the completed work items from the data records;
generating predictors through machine learning using the timing data and the extracted feature values as input samples, wherein the predictors include a particular predictor to specify a transition probability of a particular state transition for a work item with specific feature values;
using the generated predictors to create a transition matrix for the work item with specific feature values, wherein the transition matrix specifies transition probabilities for each state transition that the work item traverses and includes rows and columns,
wherein the transition matrix includes a first value at a first row and a first column and a second value at the first row and a second column, the first value corresponding to a length of time that the work item remained in a first state and the second value corresponding to a number of times that the work item transitioned from the first state to a second state; and
referencing the transition matrix to determine an estimated timing of the particular state transition for an uncompleted work item.

2. The method of claim 1, wherein the predictors further include other predictors to specify transition probabilities of different state transitions for a work item with the specific feature values.

3. The method of claim 1, wherein the predictors further include another predictor to specify a different transition probability of the particular state transition for a work item with feature values different from the specific feature values.

4. The method of claim 1, further comprising generating a predicted work item distribution using the predictors, wherein the predicted work item distribution estimates a number of uncompleted work items in different work item states at a future time period.

5. The method of claim 4, wherein generating the predicted work item distribution comprises applying a work item injection estimation model to estimate a number of work items entering an initial work item state.

6. The method of claim 1, further comprising estimating a completion time for the uncompleted work item using the predictor.

7. The method of claim 6, wherein estimating the completion time comprises aggregating a predicted timing for each state transition that the uncompleted work item traverses in order to reach completion.

8. The method of claim 1, wherein work item comprises a defect in the software application, a requirement for the software application, an incident associated with the software application, or any combination thereof.

9. The method of claim 1, wherein extracting the feature values from a given completed work item comprises determining an aggregated feature value representative of multiple different features of the given completed work item.

10. A non-transitory machine-readable medium comprising instructions executable by a processing resource to:
access data records of completed work items associated with managing a lifecycle of a software application;
extract feature values from the data records of the completed work items for a selected set of features;
determine timing data of state transitions for the completed work items from the data records;
use machine learning with the timing data and the extracted feature values as input samples to generate predictors of transition probabilities of state transitions for work items with various feature values for the extracted feature values;
use the predictors to create a transition matrix for a work item with specific feature values, wherein the transition matrix specifies transition probabilities for each state transition that the work item traverses and includes rows and columns,
wherein the transition matrix includes a first value at a first row and a first column and a second value at the first row and a second column, the first value corresponding to a length of time that the work item remained in a first state and the second value corresponding to a length of time the work item remained in the first state prior to transitioning from the first state to the second state; and
reference the transition matrix to determine an estimated timing of a particular state transition for the uncompleted work item.

11. The non-transitory machine-readable medium of claim 10, wherein the instructions are further executable to:
use the predictor to create a transition matrix for a work item with different feature values from the specific feature values.

12. The non-transitory machine-readable medium of claim 10, wherein the instructions are further executable to:
generate a predicted work item distribution using the predictor, wherein the predicted work item distribution estimates a number of uncompleted work items in different work item states at a future time period.

13. The non-transitory machine-readable medium of claim 12, wherein the instructions are executable to generate a predicted work item distribution through application of a work item injection estimation model to estimate a number of work items entering an initial work item state.

14. The non-transitory machine-readable medium of claim 10, wherein the instructions are further executable to:
estimate a completion time for the uncompleted work item using the transition matrix, including through aggregation of predicted timings for each state transition that the uncompleted work item traverses in order to reach completion.

15. A system comprising:
a processor; and
a memory on which is stored machine readable instructions that are to cause the processor to:
access data records of completed work items associated with managing a lifecycle of a software application;
extract feature values from the data records of the completed work items for a selected set of features;
determine timing data of state transitions for the completed work items from the data records;
access a transition matrix for a work item with specific feature values, wherein the transition matrix specifies transition probabilities for each state transition that the work item with the specific feature values traverses and includes rows and columns,
wherein the transition matrix includes a first value at a first row and a first column and a second value at the first row and a second column, the first value corresponding to a length of time that the work item remained in a first state and the second value corresponding to one of a number of times that the work item transitioned from the first state to a second state or a length of time that the work item remained in the first state prior to transitioning from the first state to the second state, and wherein the transition probabilities are estimated through machine learning using the timing data and the extracted feature values as input samples; and
reference the transition matrix to determine an estimated timing of state transitions for an uncompleted work item with the specific feature values.

16. The system of claim 15, wherein the instructions are further to cause the processor to:
create, via the machine learning, the transition matrix for a work item with the specific feature values; and
create, via the machine learning, a different transition matrix for a work item with different feature values from the specific values, wherein the different transition matrix specifies transition probabilities for each state transition that the work item with the different feature values traverses.

17. The system of claim 15, wherein the instructions are further to cause the processor to generate a predicted work item distribution, wherein the predicted work item distribution estimates a number of uncompleted work items in different work item states at a future time period.

18. The system of claim 17, wherein the instructions are further to cause the processor to generate the predicted work item distribution further through application of a work item injection estimation model to estimate a number of work items entering an initial work item state for the software application up to the future time period.

19. The system of claim 15, wherein the instructions are further to cause the processor to:
extract feature values from the uncompleted work item; and determine the extracted feature values from the uncompleted work item match the specific feature values for the transition matrix.

20. The system of claim 15, wherein the instructions are further to cause the processor to estimate a completion time for the uncompleted work item using the transition matrix, including through aggregation of predicted timings for each state transition that the uncompleted work item traverses in order to reach completion.

* * * * *